(12) United States Patent
Bhatt et al.

(10) Patent No.: US 9,739,934 B2
(45) Date of Patent: Aug. 22, 2017

(54) METHOD FOR PRODUCING FIBERS HAVING OPTICAL EFFECT-PRODUCING NANOSTRUCTURES

(71) Applicant: EMPIRE TECHNOLOGY DEVELOPMENT LLC, Wilmington, DE (US)

(72) Inventors: Hemanshu D. Bhatt, Bangalore (IN); Sunit D. Tyagi, Bangalore (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 368 days.

(21) Appl. No.: 14/590,758

(22) Filed: Jan. 6, 2015

(65) Prior Publication Data
US 2015/0147559 A1    May 28, 2015

Related U.S. Application Data

(62) Division of application No. 14/129,035, filed as application No. PCT/IB2011/054594 on Oct. 17, 2011, now Pat. No. 8,940,199.

(30) Foreign Application Priority Data

Sep. 2, 2011   (IN) .......................... 3016/CHE/2011

(51) Int. Cl.
*G02B 6/02*    (2006.01)
*G02B 1/04*    (2006.01)
(Continued)

(52) U.S. Cl.
CPC ............ *G02B 6/0229* (2013.01); *B82Y 20/00* (2013.01); *G02B 1/005* (2013.01); *G02B 1/046* (2013.01);
(Continued)

(58) Field of Classification Search
CPC ...... G02B 6/0229; G02B 1/046; G02B 1/048; G02B 1/005; G02B 6/02342; G02B 6/02309
See application file for complete search history.

(56) References Cited

U.S. PATENT DOCUMENTS 5,407,738 A    4/1995   Tabata et al.
6,326,094 B1   12/2001  Asano et al.
(Continued)

FOREIGN PATENT DOCUMENTS

CN    1664187      9/2005
CN    101227968    7/2008
(Continued)

OTHER PUBLICATIONS

Balint, Z. et al., "Scanning Electron Microscopic Investigations in Butterfly Wings: Detecting Scale Micro- and Nanomorphology and Understanding their Functions," Current Issues on Multidisciplinary Microscopy Research and Education, 2004, pp. 87-92.
(Continued)

*Primary Examiner* — Mathieu Vargot
(74) *Attorney, Agent, or Firm* — Maschoff Brennan (57) ABSTRACT

The present technology provides an illustrative method for preparing fibers with desirable optical characteristics. The method includes providing a fiber that comprises a core layer and a cladding layer located around the core layer. The method further includes applying a nanostructure template to the cladding layer to form one or more photonic nanostructures having nanostructure scales and compressing the core layer to cause the core layer to bulge and form air gaps between the core layer and the one or more photonic nanostructures.

17 Claims, 11 Drawing Sheets

(51) Int. Cl.
  *G02B 1/00* (2006.01)
  *B82Y 20/00* (2011.01)
  *B82Y 40/00* (2011.01)

(52) U.S. Cl.
  CPC ......... *G02B 1/048* (2013.01); *G02B 6/02309* (2013.01); *G02B 6/02342* (2013.01); *B82Y 40/00* (2013.01); *G02B 6/02033* (2013.01); *G02B 6/02319* (2013.01); *G02B 6/02376* (2013.01); *Y10S 977/70* (2013.01); *Y10T 428/249921* (2015.04)

(56) References Cited

U.S. PATENT DOCUMENTS

| | | |
|---|---|---|
| 2008/0197071 A1 | 8/2008 | Lee et al. |
| 2008/0199629 A1 | 8/2008 | Simor et al. |
| 2009/0130301 A1 | 5/2009 | Bahnmuller et al. |

FOREIGN PATENT DOCUMENTS

| | | |
|---|---|---|
| CN | 101790601 | 7/2010 |
| JP | H01-132888 | 5/1989 |
| JP | 2007-146338 | 6/2007 |
| WO | WO-03/062900 | 7/2003 |
| WO | WO-2010/017648 | 2/2010 |
| WO | WO-2010/126640 | 11/2010 |

OTHER PUBLICATIONS

International Search Report and Written Opinion for PCT/IB2011/054594 mailed Jan. 13, 2012.

Iwase et al., "The Structural-Color Based on the Mechanism of Butterfly Wing Coloring for Wide Viewing Angle Reflective Display," Micro Electro mechanical Systems, 2004, 17th IEEE International Conference on MEMS.
Kinoshita, S. et al., "Photophysics of Structural Color in the Morpho Butterflies," Forma, 2002, vol. 17, pp. 103-121.
Kostovski, G. et al., "Nanoimprinted optical fibres: Biotemplated nanostructures for Sers sensing," Biosensors and Bioelectrics, 2009, vol. 24, No. 5, pp. 1531-1535.
Kostovski, G. et al., "Novel Parallel Array Imprinting of Nanophotonic Structures on Optical Fibre Facets," Optical Fibre Technology (ACOFT), 2010 35th Australian Conference on, Dec. 5-9, 2010, pp. 1-3.
Kustandi, T. et al., "Mimicking Domino-Like Photonic Nanostructures on Butterfly Wings," Small, 2009, vol. 5, pp. 574-578.
Miyamoto, K. et al., "Cuticular Microstructures and Their Relationship to Structural Color in the Shieldbug Poecilocoris lewisi Distant," Forma, 2002, vol. 17, pp. 155-167.
Non-Final Office Action in U.S. Appl. No. 14/129,035 ctd May 13, 2014 (4 pages).
Nose, K., "Structurally Colored Fiber Morphotex," Annals of the High Performance Paper Society, No. 43, 2004, pp. 17-21.
Notice of Allowance in U.S. Appl. No. 14/129,035 dtd Sep. 17, 2014 (5 pages).
Prum, R.O. et al., "Anatomically diverse butterfly scales all produce structural colours by coherent Scattering," The Journal of Experimental Biology, 2006, vol. 209, pp. 748-765.
Tayeb, G. et al., "Structural Colors in Nature and Butterfly-Wing Modeling," Optics and Photonics News, Feb. 2003, pp. 40-43.
Wu, W. et al., "Research on Spectral REflection Characteristics of nanostructures in Morpho Butterfly Wing Scale," Journal of Physics: Conference Series, vol. 276, 2011, pp. 1-9.

METHOD FOR PRODUCING FIBERS HAVING OPTICAL EFFECT-PRODUCING NANOSTRUCTURES

CROSS-REFERENCE TO RELATED APPLICATIONS

The present application is a divisional filing under 35 U.S.C. §121 of U.S. patent application Ser. No. 14/129,035, filed on Dec. 23, 2013, now U.S. Pat. No. 8,940,199, which is a U.S. national stage application under 35 U.S.C. §371 claiming the benefit of International Application No. PCT/IB2011/054594, filed on Oct. 17, 2011, which claims priority to Indian Patent Application No. 3016/CHE/2011, filed on Sep. 2, 2011, the entire contents of each of which are incorporated herein by reference in their respective entireties.

BACKGROUND

The following description is provided to assist the understanding of the reader. None of the information provided or references cited is admitted to be prior art.

In traditional textile dyeing processes, large amounts of water are used as a dye solvent, resulting in one of the largest sources of water pollution for industrialized countries. Such dyeing processes often require various harmful chemicals and produce numerous harmful byproducts. In addition, traditional dyeing processes require large amounts of energy.

An alternative dye solvent to water is super critical carbon dioxide (sc-$CO_2$). However, the use of sc-$CO_2$ as a solvent has generally been limited to the dyeing of artificial fibers and has enjoyed only very limited application to natural fibers, such as cotton and wool. Sc—$CO_2$ is a hydrophobic solvent, which does not swell hydrophilic cotton or wool fibers. Sc—$CO_2$ is unable to break the hydrogen bonds between adjacent molecular chains to disrupt the structure of the natural fibers in order to facilitate the diffusion of the dye into the fibers. In addition, most commercial cotton dyes are salts, which are insoluble in sc-$CO_2$ without the use of co-solvents. However, the use of co-solvents requires that the fabrics become saturated, thus requiring drying of the fabrics and more complex cleaning of the process chamber and dyeing components.

Nature has demonstrated alternative methods of producing colors that do not necessarily require the use of dyes. By arranging structures to manipulate light, different colors can be created through interference effects. For example, various moths and butterflies have photonic structures on a nanoscale that produce a multitude of mechanisms for producing various visual effects, including multilayer interference, diffraction, Bragg scattering, Tyndall scattering, and Rayleigh scattering to create colors. These structures can have multiple microstructures from the micron scale to nanometers arranged in various shapes and sizes separated by nanometer scale ridges and periodic airgaps. One example for selectively reflecting blue-green light is seen on the tropical butterfly Morphos.

SUMMARY

The present technology provides an illustrative method for preparing fibers. The method includes providing a fiber that comprises a core layer and a cladding layer located around the core layer. The method further includes applying a nanostructure template to the cladding layer to form one or more photonic nanostructures having nanostructure scales and compressing the core layer to cause the core layer to bulge and form air gaps between the core layer and the one or more photonic nanostructures.

The present technology further provides an illustrative fiber that includes a core layer and a cladding layer. The cladding layer surrounds at least a portion of the core layer and includes one or more photonic nanostructures. The photonic nanostructures comprise one or more nanostructure scales. The photonic nanostructures also have a first end that is bonded to the core layer and a second end that is physically separated from the core layer such that an air gap exists between a portion of the photonic nanostructure and the core layer.

The present technology also includes an illustrative textile produced from multiple fibers. The fibers comprise a core layer and a cladding layer. The cladding layer surrounds at least a portion of the core layer and includes one or more photonic nanostructures. The photonic nanostructures comprise one or more nanostructure scales. The photonic nanostructures also have a first end that is bonded to the core layer and a second end that is physically separated from the core layer such that an air gap exists between a portion of the photonic nanostructure and the core layer.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

There are several issues associated with traditional dyeing processes that use water or super critical carbon dioxide as dye solvents. These include, but are not limited to, the large amount of water pollution generated and energy expended by these processes. Described herein are illustrative methods and fibers for implementing photonic nanostructures to manipulate light and produce colors. Such fibers allow for improved coloring effects in fibers and textiles while reducing the harmful byproducts produced and the energy required by traditional textile dyeing processes.

Figure 1:
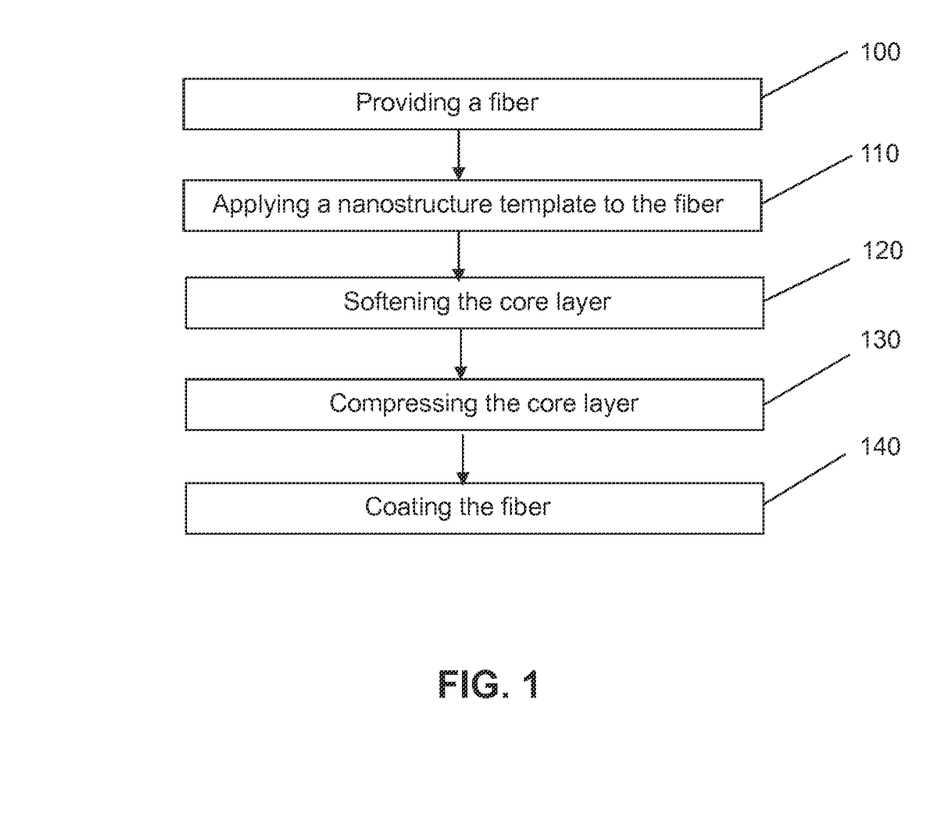
FIG. 1 depicts a method of producing a fiber in accordance with an illustrative embodiment.
Figure 2:
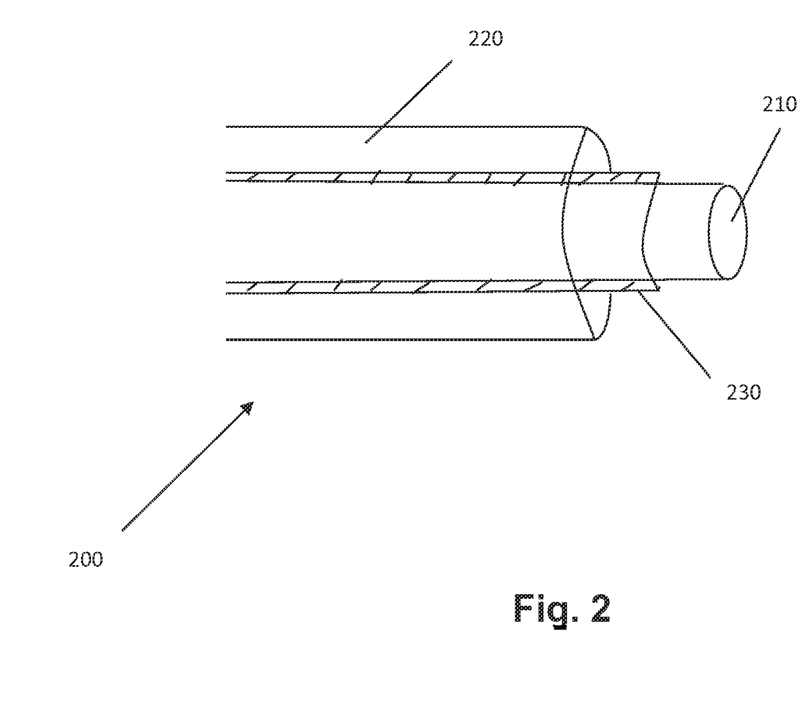
FIG. 2 depicts a fiber in accordance with an illustrative embodiment.

FIG. 1 depicts a method of producing a fiber in accordance with an illustrative embodiment. In an operation 100, a fiber comprising a core layer and a cladding layer is provided such that the cladding layer surrounds at least a portion of the core layer. FIG. 2 depicts such a fiber in accordance with an illustrative embodiment, as discussed in more detail below.

In a first embodiment, the fiber is manufactured by an extrusion process. In alternative embodiments, the fiber may be manufactured by a drawing or spinning process or by any other suitable process known to those of skill in the art.

The core layer and the cladding layer are made of different materials having different refractive indices. These materials may include nylon, polypropylene, polyester, poly vinyl acetate, poly acryl nitrile, polyethylene terephthalate, or other suitable polymeric materials known to those of skill in the art. In an embodiment, the core layer and the cladding layer may have refractive indices having a difference of about 0.2. In other embodiments, the core layer and the cladding layer may have refractive indices that differ by about 0.1 to about 0.4. In an embodiment, the core layer and the cladding layer are made of different thermoplastic polymers each having different glass transition temperatures. In a further embodiment, at least one of the core layer and the cladding layer are transparent. In still a further embodiment, the cladding layer may include multiple layers each having a thickness and a refractive index optically designed to enable a selective reflection of desired color or bandwidth of light.

The fiber may further include an optional interfacial layer located between the core layer and the cladding layer. The interfacial layer may include silicones or other suitable materials that are capable of reducing the bonding between the core layer and the cladding layer. In alternative embodiments, the fiber may not include an interfacial layer. The interfacial layer may be configured to facilitate the release of at least a portion of the cladding layer from the core layer. For example, the interfacial layer may be configured to weaken the bond at the interface between the core layer and the cladding layer such that the cladding layer may be easily delaminated from the core layer.

In an operation 110, a nanostructure template is applied to the cladding layer of the fiber. The nanostructure template may be applied by heating the fiber and thereby softening the cladding layer. In an embodiment, the cladding layer is heated to a temperature above a glass transition temperature of the cladding layer. A mold may be applied to the softened cladding layer with sufficient pressure to transfer the nanostructure template to the cladding layer. In an embodiment, the mold is applied with a pressure of about 2 bars to about 50 bars for a duration of a few seconds to several minutes. In an embodiment, the mold may be cylindrically shaped such that it may be applied around the fiber.

The mold may be aligned via a self-alignment process or may be aligned using an optical alignment method known to those of skill in the art. In an embodiment, the optical alignment process includes a process by which the edge of the fiber is aligned to the edge of the mold using a laser alignment technique or optical techniques using alignment structures that can be identified by laser reflection or optical microscopy. In another embodiment, the alignment can also be time-based using the speed of the fiber movement and the size of the mold as known to those of skill in the art.

After the mold is applied to the cladding layer with sufficient force and for a sufficient amount of time, the mold may be then separated from the cladding layer leaving one or more photonic nanostructures formed in the cladding layer according to the design of the nanostructure template.

In an embodiment, a surface of the mold is coated with a mold release agent to facilitate the removal of the mold from the fiber. Example release agents may include silicones, poly siloxanes such as polydimethylsiloxane, methyl hydrogen siloxanes, or any other suitable release agents as known to those of skill in the art. In alternative embodiments, a mold release agent may not be used.

Figure 3:
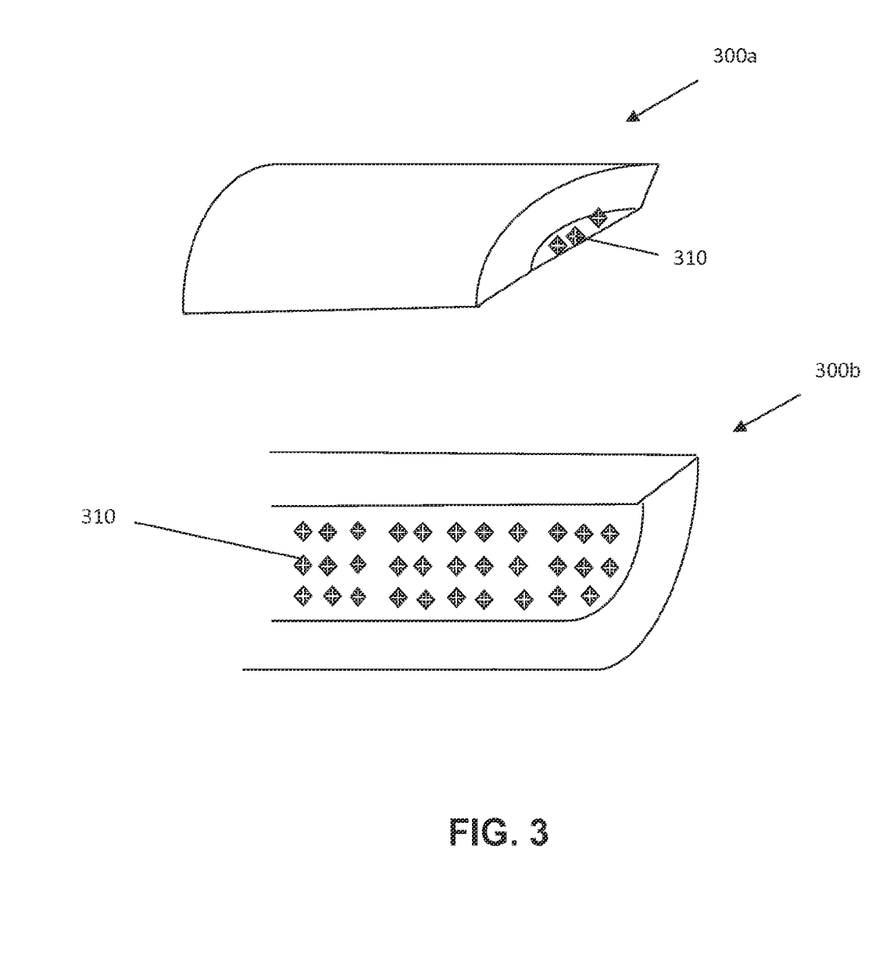
FIG. 3 depicts a mold having a nanostructure template in accordance with an illustrative embodiment.
Figure 4:
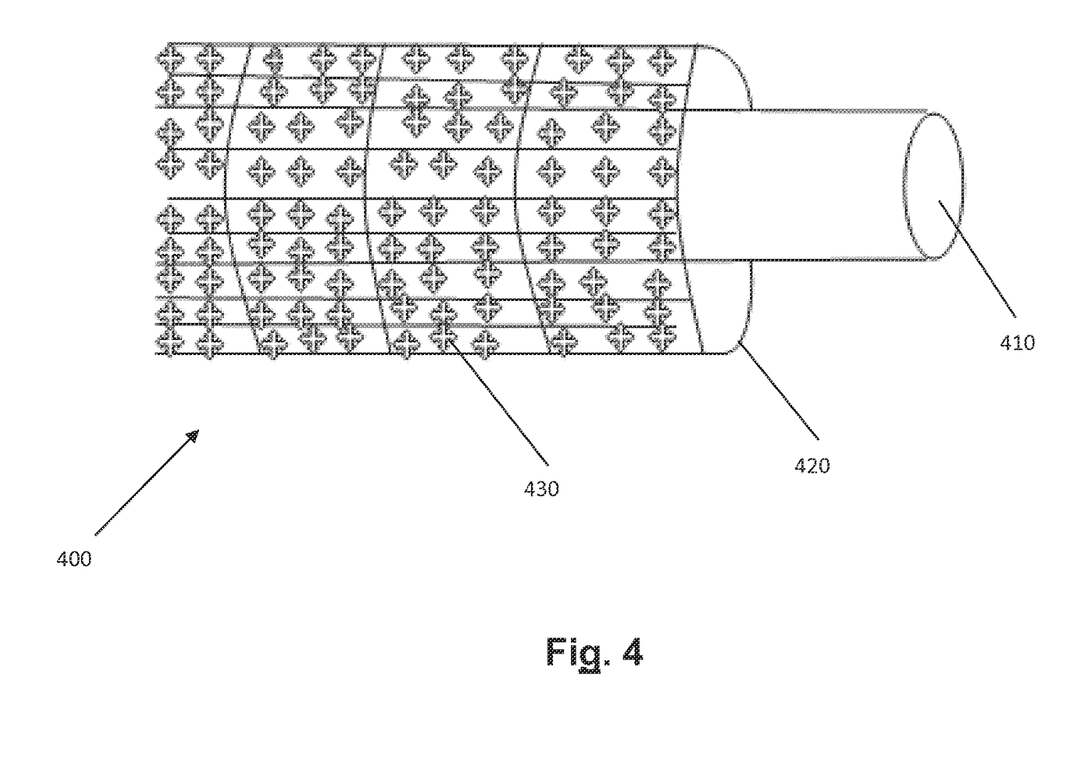
FIG. 4 depicts a fiber having one or more nanostructure scales in accordance with an illustrative embodiment.

FIG. 3 depicts a mold having a nanostructure template in accordance with an illustrative embodiment, as described in more detail below. FIG. 4 depicts a fiber having one or more photonic nanostructures after application of the mold to the fiber in accordance with an illustrative embodiment, as described in more detail below.

Figure 5:
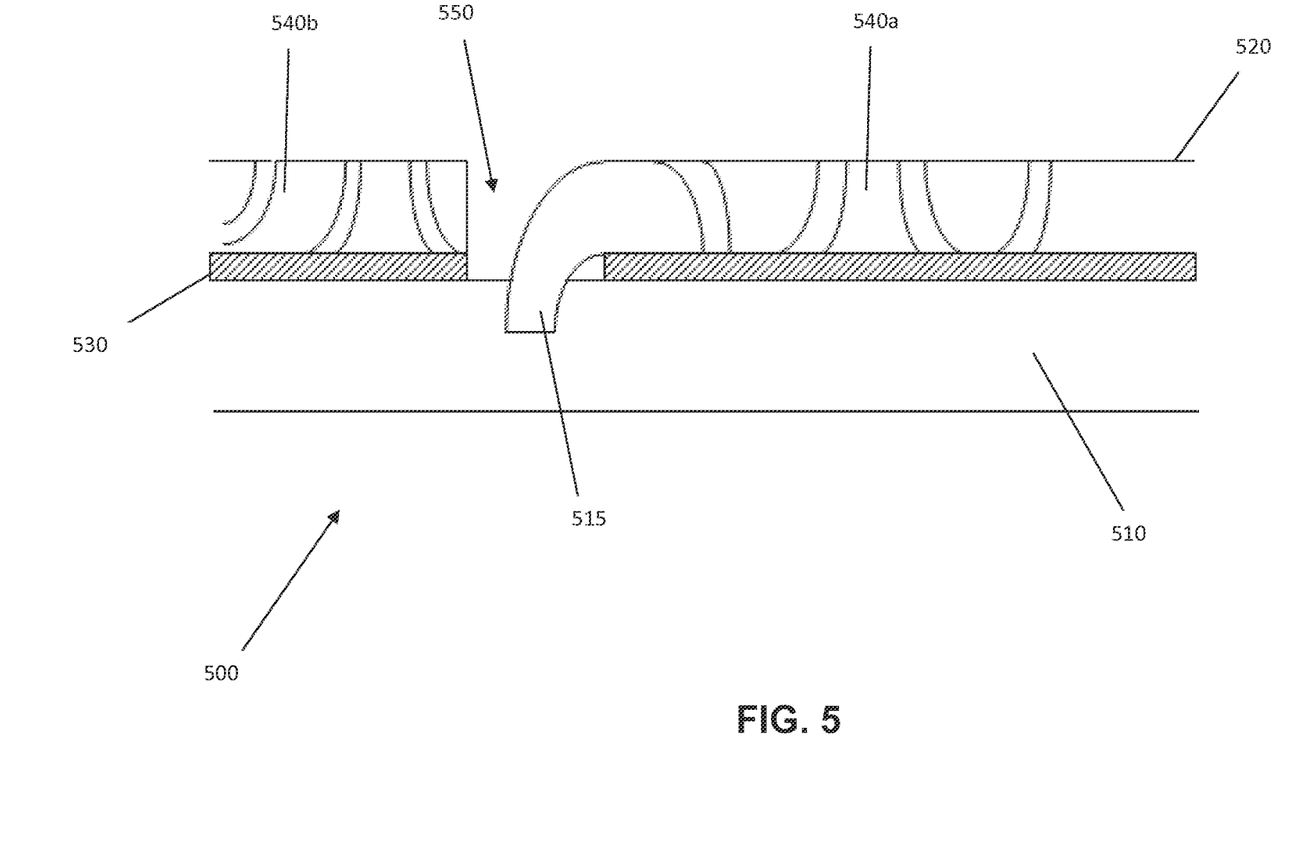
FIG. 5 depicts a fiber having a photonic nanostructure embedded in its core in accordance with an illustrative embodiment.

According to an embodiment, in order to create the photonic nanostructures in the cladding layer, the cladding layer may be intermittently cleaved. The cleaving of the cladding layer may be accomplished by pressing the mold (which includes a corresponding portion of the nanostructure template that is designed to cleave the cladding layer in a desired location) such that the mold forces a portion of the cladding layer into the core layer, thereby puncturing the interfacial layer between the cladding layer and the core layer and embedding a portion of a photonic nanostructure within the core layer. FIG. 5 depicts a fiber having a photonic nanostructure embedded in its core in accordance with an illustrative embodiment, as described in more detail below.

In an alternative embodiment, photonic nanostructures may be individually defined in the cladding layer of the fiber by designing intermittent gaps in the interfacial layer, thus enabling the cladding layer to be directly bonded to the core layer within the intermittent gaps. Such a design eliminates the need to puncture the interfacial layer and to embed a portion of the cladding layer within the core layer. In an embodiment, the gaps in the interfacial layer may be created during manufacture of the fiber by intermittently depositing the interfacial layer on the core layer such that gaps in the interfacial layer are formed at desired locations on the core layer. The cladding layer may be formed over the interfacial layers and the gaps such that it is in direct contact with the cladding layer within the gaps and in direct contact with the interfacial layer outside of the gaps.

Figure 6:
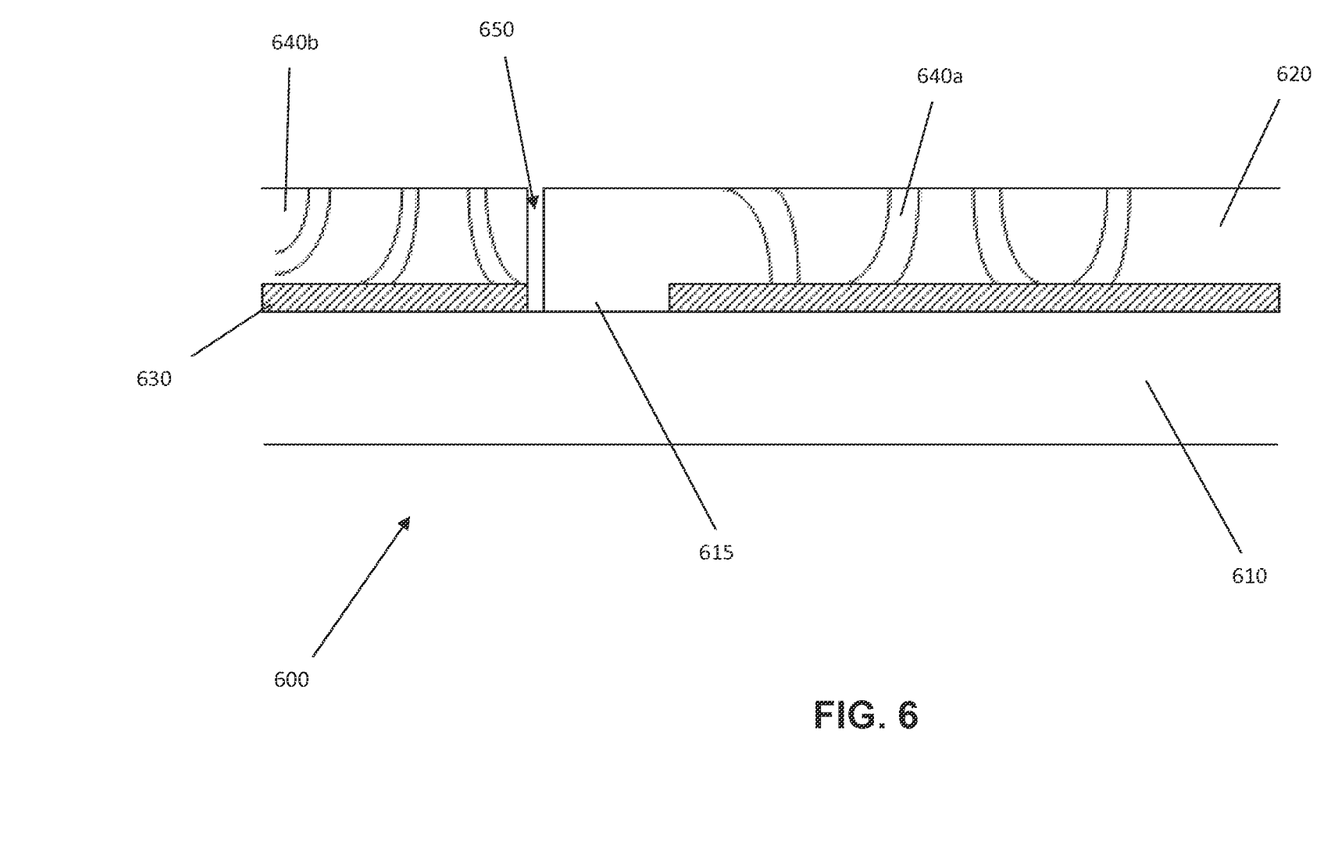
FIG. 6 depicts a fiber having a photonic nanostructure attached to its core through a gap in an interfacial layer in accordance with an illustrative embodiment.

In an alternative embodiment, the interfacial layer may be formed over all or a vast majority of the core layer and then portions of the interfacial layer may be removed to form the gaps. The portions of the interfacial layer may be removed by dissolving the interfacial layer, by scraping or grinding the interfacial layer, by a thermal means such as laser ablation of the interfacial layer, or by any alternative means known to those of skill in the art. In a further alternative embodiment, the interfacial layer may be a sublimating interfacial layer that is configured to sublimate during the softening and/or compressing steps described below (i.e., operations 120 and 130 of FIG. 1), thus leaving behind a photonic nanostructure having at least a first portion that is directly connected to the core layer and a second portion that is separated from the core layer. FIG. 6 depicts a fiber having a photonic nanostructure attached to its core through a gap in an interfacial layer in accordance with an illustrative embodiment, as described in more detail below.

In an operation 120, the core layer of the fiber is softened. The softening of the fiber may be accomplished by heating the fiber, by irradiating the fiber with infrared radiation, or by any other method of softening the core layer known to those of skill in the art. The softening of the fiber may involve heating the fiber to temperatures above the glass transition temperatures of the core layer and/or the cladding layer to achieve a desired viscosity required for the deformation of the material of the core layer. In an embodiment, the fiber may be heated to about 150 degrees Celsius or warmer.

In an operation 130, the core layer is compressed along its axis to cause the core layer to bulge outward. The bulging of the core layer causes portions of the photonic nanostructures formed in the cladding layer to delaminate and separate from the core layer. In an embodiment, the core layer may be compressed in sections that correspond to the size of the individual photonic nanostructures formed in the cladding layer. This compressing the core layer in sections allows for better control of the delamination and separation of the individual photonic nanostructures from the core layer.

Figure 7:
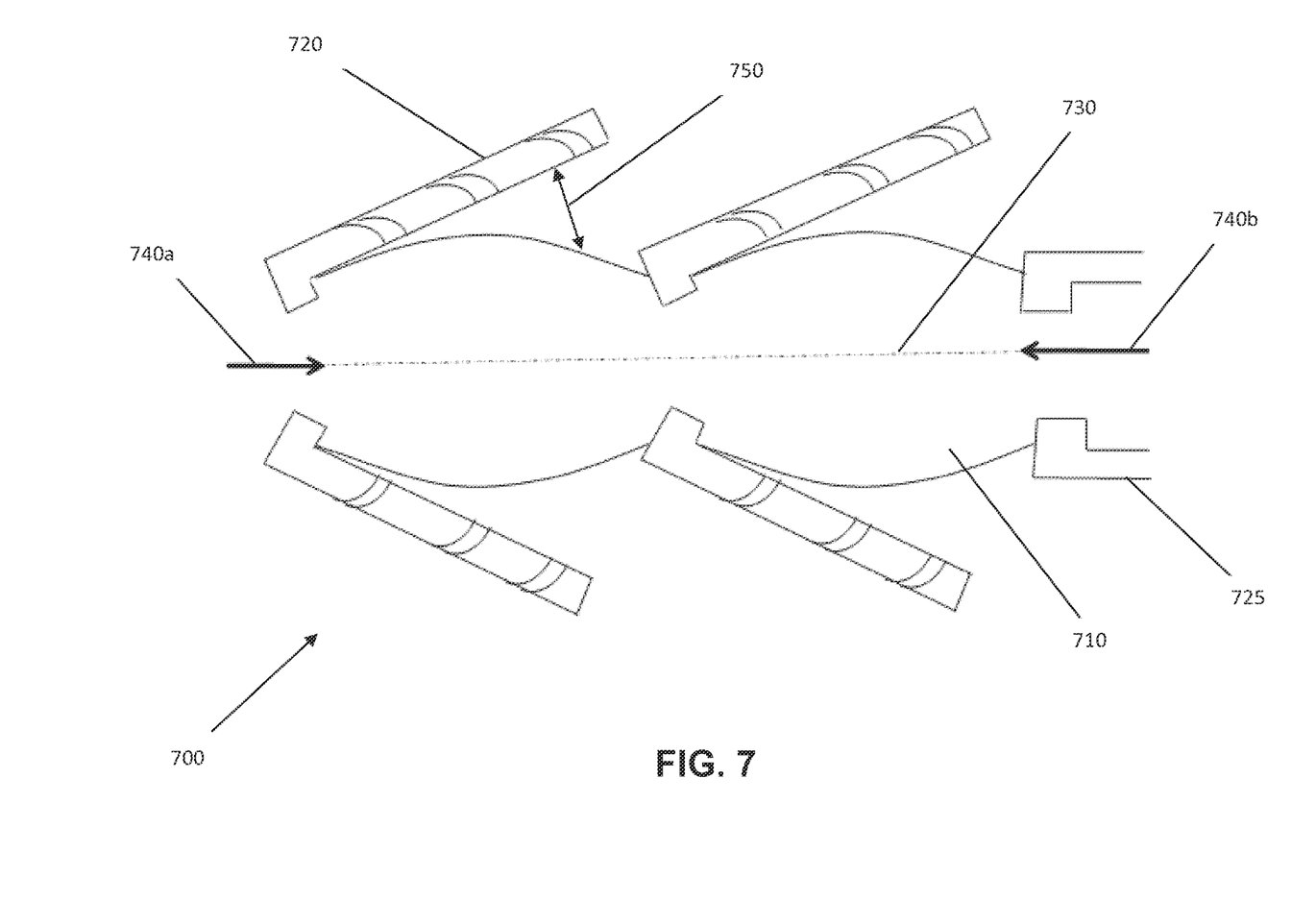
FIG. 7 depicts a compressed fiber having separated photonic nanostructures in accordance with an illustrative embodiment.

The bulging of the core layer thereby causes an air gap to become formed between a portion of each of the individual, delaminated photonic nanostructures and the core layer. The amount of compression applied to the core layer can be modified in order to control the size of the air gaps and the size and configuration of the array of photonic nanostructures. In this way, the color of the fiber can be finely tuned because the size of the air gaps and the spatial relationship between the photonic nanostructures will affect the color and other visual effects produced by the fiber. FIG. 7 depicts a compressed fiber having separated photonic nanostructures in accordance with an illustrative embodiment, as discussed in more detail below.

In an operation 140, the fiber is coated with low-refractive materials to preserve the structure of the photonic nanostructures and to maintain the optical characteristics of the fiber. The low-refractive materials may include fluoro-doped methacrylates such as poly hexafluorobutyl methacrylate and poly hexafluoroisopropyl methacrylate, siloxane-doped fluorinated polymers, or any other suitable low-refractive material known to those of skill in the art. In an embodiment, the coating is spray coated onto the fiber. In alternative embodiments, the coating may be applied by spin-coating, dip-coating, interfacial polymerization, electrophoretic deposition or by any other suitable method known to those of skill in the art.

As mentioned above, FIG. 2 depicts a fiber 200 in accordance with an illustrative embodiment. Fiber 200 includes a core layer 210 and a cladding layer 220 that surrounds at least a portion of core layer 210. Core layer 210 and cladding layer 220 are made of different materials having different refractive indices. These materials may include nylon, polypropylene, polyester, poly vinyl acetate, poly acryl nitrile, polyethylene terephthalate, or other suitable polymeric materials known to those of skill in the art. In an embodiment, the core layer and the cladding layer may have refractive indices having a difference of about 0.2. In other embodiments, the core layer and the cladding layer may have refractive indices that differ by about 0.1 to about 0.4. In an embodiment, at least one of core layer 210 and cladding layer 220 are visually transparent.

Fiber 200 further includes an optional interfacial layer 230 located between core layer 210 and cladding layer 220. Interfacial layer 230 may include silicones or other suitable materials that are capable of reducing the bonding between the core layer and the cladding layer. In alternative embodiments, fiber 200 may not include interfacial layer 230. Interfacial layer 230 is configured to facilitate the separation of at least a portion of cladding layer 220 from core layer 210. For example, interfacial layer 230 may be configured to weaken the bond at the interface between core layer 210 and cladding layer 220 such that cladding layer 220 may be delaminated and separated from core layer 210. In an embodiment, interfacial layer 230 may be a sublimating interfacial layer that is configured to sublimate during the softening and/or compressing steps described above (i.e., operations 120 and 130 of FIG. 1), thus leaving behind a photonic nanostructure having at least a portion that is separated from core layer 210.

FIG. 3 depicts a mold having a nanostructure template in accordance with an illustrative embodiment. In an embodiment, such a mold may be applied to a fiber as described above with respect to operation 110 of FIG. 1. In an embodiment, the mold includes an upper portion 300a and a lower portion 300b. Upper and lower portions 300a, 300b of the mold also include nanostructure templates 310. In an embodiment, nanostructure template 310 is designed such, that upon application of the mold to the fiber, one or more photonic nanostructures are formed in the cladding layer in order to produce optically desirable qualities in the fiber. In an embodiment, the photonic nanostructures may have a size of about 10 nanometers (nm) to about 200 nm. The photonic nanostructures may be created to mimic photonic structures found on moths, butterflies, or any other photonic structure having optically desirable qualities known to those of skill in the art. In an embodiment, individual photonic nanostructures may have different shapes and sizes from other photonic nanostructures on the same fiber to allow for selective reflectivity of a desired color due to constructive and destructive interference effects. In an embodiment, the photonic nanostructures may have a width of about 150 nm to about 350 nm to reflect light in the visible spectrum.

Depending on the specific configurations of the photonic nanostructures, the fiber may have different properties when wet and dry due to the different refractive indices associated with the fiber when wet and when dry. The optical qualities, including the color of the fiber, can, therefore, be tuned by changing the size, shape, and materials of the photonic nanostructures as well as the spatial configuration of the photonic nanostructure with respect to each other.

FIG. 4 depicts a fiber 400 having one or more nanostructure scales 430 in accordance with an illustrative embodiment. Fiber 400 includes a core layer 410 and a cladding layer 420. One or more nanostructure scales 430 have been imprinted in cladding layer 420 via operation 110 described above. The one or more nanostructure scales 430 are arranged such that one or more photonic nanostructures are formed within cladding layer 420 in an arrangement that will produce an optically desirable effect within fiber 400.

FIG. 5 depicts a fiber 500 having a photonic nanostructure 540a embedded in core layer 510 in accordance with an illustrative embodiment. Fiber 500 includes core layer 510, a cladding layer 520, and an interfacial layer 530 located between core layer 510 and cladding layer 520. A portion 515 of cladding layer 520 has punctured interfacial layer 530 and has become embedded in core layer 510 via the cleaving process described above or via any other process known to those of skill in the art for embedding a cladding layer within a core layer. Fiber 500 further includes an opening 550 located between photonic nanostructure 540a and photonic nanostructure 540b. This opening may be formed via the cleaving process or may be formed by intermittently depositing cladding layer 620 over interfacial layer 530 during the manufacturing of fiber 500.

FIG. 6 depicts a fiber 600 having a photonic nanostructure 640 attached to core layer 610 through a gap 615 in an interfacial layer 630 in accordance with an illustrative embodiment. Fiber 600 includes core layer 610, a cladding layer 620, and interfacial layer 630. Interfacial layer 630 includes gap 615 within which photonic nanostructure 640 is directly attached to core layer 610. Fiber 600 further includes an opening 650 located between photonic nanostructure 640a and photonic nanostructure 640b. Opening 650 may be formed via the cleaving process discussed above or alternatively may be formed by intermittently depositing cladding layer 620 over interfacial layer 630 and core layer 610 during the manufacturing of fiber 600.

FIG. 7 depicts a compressed fiber 700 having separated photonic nanostructures 720 in accordance with an illustrative embodiment, as discussed in more detail below. Fiber 700 includes a core layer 710, separated photonic nanostructures 720, and unseparated photonic nanostructures 725. Upon a first force being applied to core layer 710 in a direction 740a and/or a second force being applied to core layer 710 in a direction 740b, core layer 710 is compressed along its axis 730. The compression causes core layer 710 to bulge outward (e.g., away from axis 730), thus causing the separation of at least a portion of photonic nanostructures 720 from core layer 710. The separation photonic nanostructures 720 from core layer 710 creates air gaps 750 between portions of separated photonic nanostructures 720 and core layer 710. The amount of compression applied to core layer 710 can be modified in order to control the size of air gaps 750 and the size and configuration of separated photonic nanostructures 720 with respect to each other, thus allowing for the color as well as other optical characteristics of fiber 700 to be adjusted as desired.

Figure 8A:
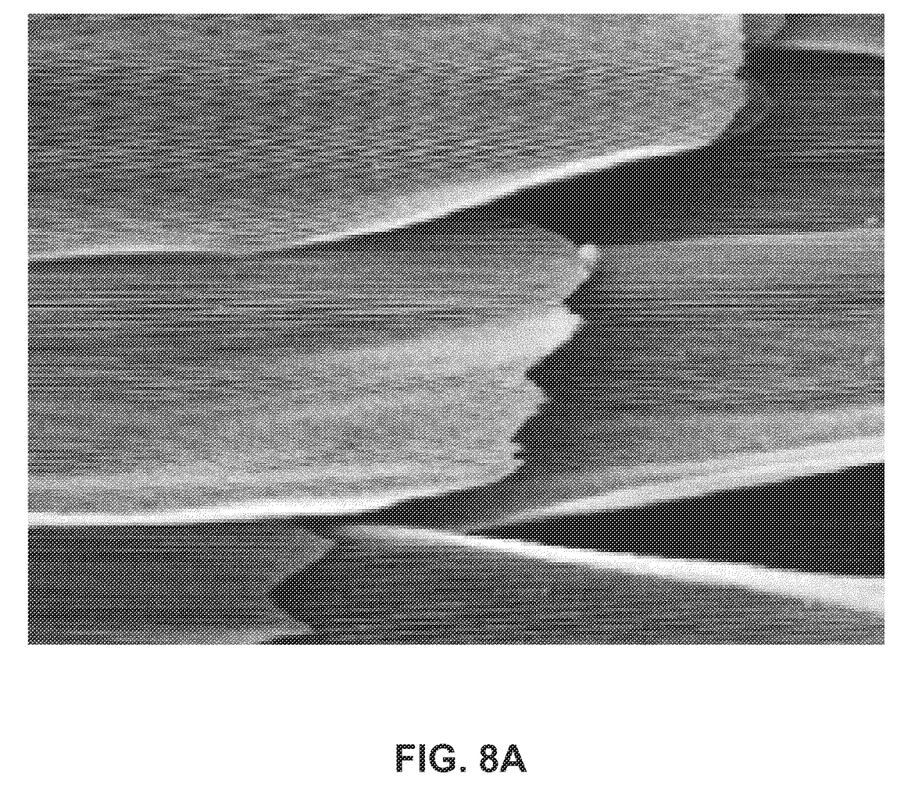
FIG. 8a depicts photonic nanostructures on the surface of a butterfly wing in accordance with an illustrative embodiment.
Figure 8B:
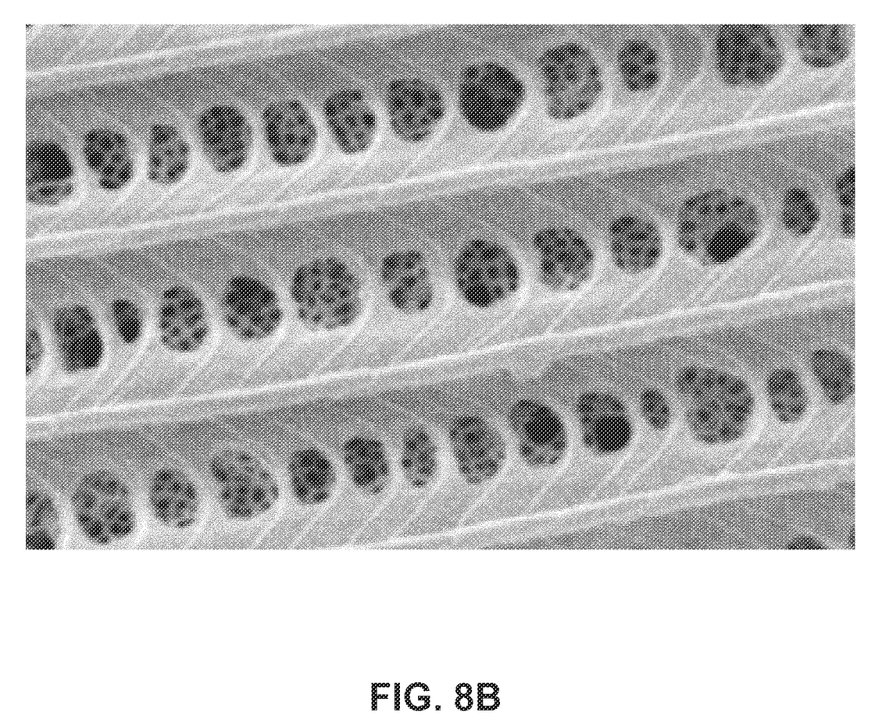
FIG. 8b depicts photonic nanostructures having pepper pot-like structure in accordance with an illustrative embodiment.
Figure 8C:
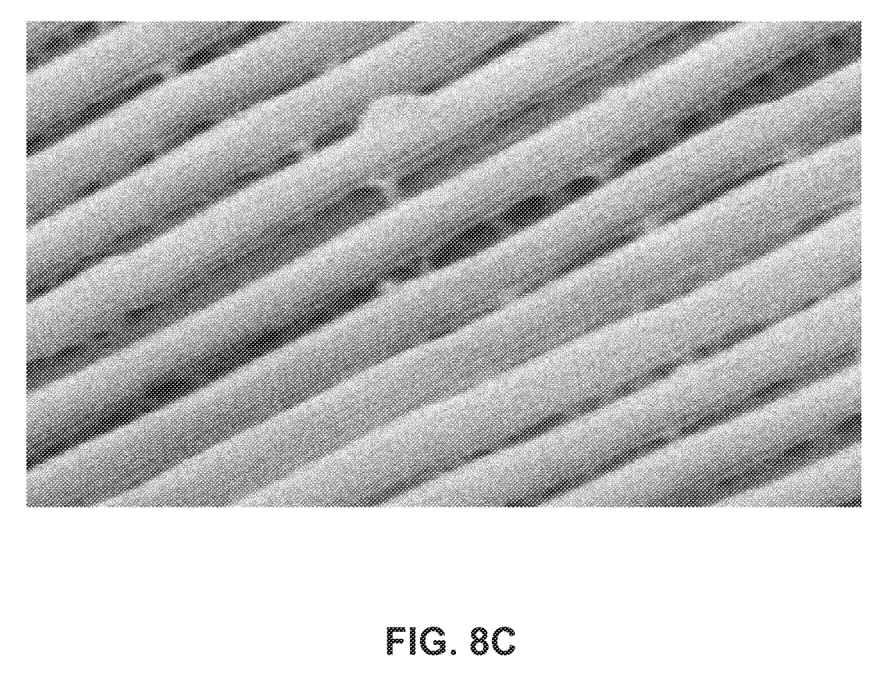
FIG. 8c depicts photonic nanostructures have a parallel tubular flute-like structure in accordance with an illustrative embodiment.

FIG. 8a depicts photonic nanostructures on the surface of a butterfly wing in accordance with an illustrative embodiment. Such photonic nanostructures include long, thin parallel hair-like structures having a thickness of about 150 nanometers and are separated by air spaces. FIG. 8b depicts photonic nanostructures having a pepper pot-like structure in accordance with an illustrative embodiment. FIG. 8c depicts photonic nanostructures have a parallel tubular flute-like structure in accordance with an illustrative embodiment. The various photonic nanostructures of FIGS. 8a, 8b, and 8c exhibit microscopic features such as scales, ridges, and pores that manipulate incident light in various ways. In an embodiment, separated nanostructures 720 may be configured with similar features as the nanostructures of FIGS. 8a, 8b, and 8c.

EXAMPLE

Figure 9:
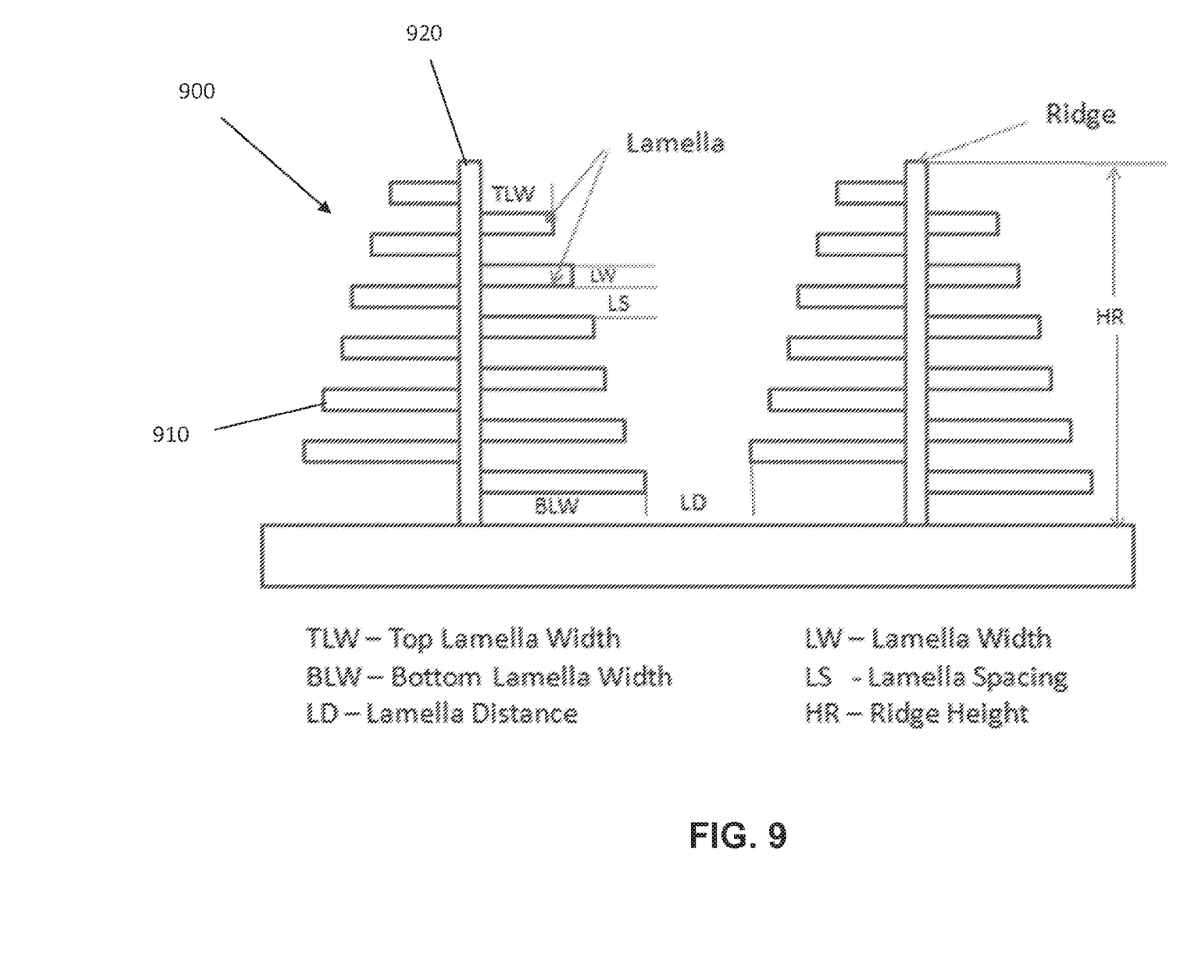
FIG. 9 depicts an example photonic nanostructure in accordance with an illustrative embodiment.

FIG. 9 depicts an example photonic nanostructure 900 in accordance with an illustrative embodiment. Photonic nanostructure 900 is based on the structure of scales of the Morpho Rhetenor butterfly. Photonic nanostructure 900 is configured to strongly reflect shorter wavelength visible light specifically in the blue region. Photonic nanostructure 900 includes a plurality of lamellas 910 distributed along a main stem-like ridge structure 920 in a "tree-like" configuration. The plurality of lamellas 910 act like gratings and are largely responsible for the reflective characteristics and visible effects of photonic nanostructure 900.

The specific configuration, sizing, and spacing of lamellas 910 enable photonic nanostructure 900 in combination with additional similar nanostructures to reflect an iridescent blue light. Photonic nanostructure 900 includes a plurality of lamellas 910 that each have a height of about 50 nm and are spaced from other lamellas by about 80 nm. In the embodiment of FIG. 9, photonic nanostructure includes thirteen lamellas 910. Lamellas 910 have a width of about 200 nm to about 400 nm and are positioned such that lamellas having a larger width are positioned toward the bottom of stem-like ridge structure 920 while lamellas having a smaller width are positioned toward the top of stem-like ridge structure 920. Stem-like ridge structure 920 has a height of about 3000 nm. Photonic nanostructure 900 is spaced from other photonic nanostructures such that the nearest lamellas of adjacent photonic nanostructures are spaced by about 110 nm. Photonic nanostructure 900 has a refractive index of about 1.55.

Factors like the distance between widest lamellas of adjacent photonic nanostructures, the number of lamellas on each photonic nanostructure, the width of lamellas, and the ridge height may influence the reflectivity and bandwidth of the reflected light but may have a smaller influence on the color of the reflected light. Meanwhile, the height of the lamellas and the spacing of lamellas on the photonic nanostructure may have a larger influence on the color characteristics of the reflected light while having a lesser influence on the reflectivity and bandwidth of the reflected light. In an example embodiment, changing the lamella height from 50 nm to 200 nm shifts the reflectivity peak across the visible spectrum from 350 nm (violet) to 750 nm (red). Similarly, changing the lamella spacing from 80 nm to 200 nm may shift the reflectivity peak from 400 nm to 650 nm. Accordingly, by changing the lamella height and spacing different colors may be produced for the fiber.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A fiber comprising:
   a core layer; and
   a cladding layer surrounding at least a portion of the core layer, wherein the cladding layer includes one or more photonic nanostructures, and wherein the one or more photonic nanostructures comprise:
      one or more nanostructure scales;
      a first end that is bonded to the core layer; and
      a second end that is physically separated from the core layer such that an air gap exists between a portion of the photonic nanostructure and the core layer.

2. The fiber of claim 1, further comprising an interfacial layer located between the core layer and the cladding layer.

3. The fiber of claim 2, wherein the interfacial layer comprises one or more gaps, and wherein the core layer is directly bonded to the cladding layer in the one or more gaps such that the first ends of the one or more photonic nanostructures are located in respective gaps of the one or more gaps.

4. The fiber of claim 2, wherein the interfacial layer is a sublimating interfacial layer configured to sublimate at least a portion of the interfacial layer to delaminate the core layer from at least a portion of the cladding layer.

5. The fiber of claim 1, wherein the core layer comprises a first material, and the cladding layer comprises a second material that is different from the first material.

6. The fiber of claim 5, wherein the first material and second material comprise different thermoplastic polymers having different glass transition temperatures.

7. The fiber of claim 5, wherein the first material comprises nylon or polypropylene, and wherein the second material comprises nylon or polyester.

8. The fiber of claim 5, wherein the first material and second material have refractive indices having a difference of at least about 0.20.

9. The fiber of claim 1, wherein the one or more photonic structures have a length of about 10 nm to about 200 nm.

10. The fiber of claim 9, wherein the one or more photonic structures have a length of about 10 nm to about 15 nm.

11. The fiber of claim 1, wherein the fiber is visibly colored.

12. The fiber of claim 1, wherein the fiber lacks an organic dye.

13. The fiber of claim 1, wherein the fiber has a first visible color appearance when dry, and has a second visible color appearance when wet with water.

14. A textile comprising:
    multiple fibers, wherein the fibers comprise:
       a core layer; and
       a cladding layer surrounding at least a portion of the core layer, wherein the cladding layer includes one or more photonic nanostructures, and wherein the one or more photonic nanostructures comprise:

one or more nanostructure scales;
a first end that is bonded to the core layer; and
a second end that is physically separated from the core layer such that an air gap exists between a portion of the photonic nanostructure and the core layer.

15. The textile of claim 14, wherein the textile is visibly colored.

16. The textile of claim 14, wherein the textile lacks an organic dye.

17. The textile of claim 14, wherein the textile has a first visible color appearance when dry, and has a second visible color appearance when wet with water.

\* \* \* \* \*